Feb. 17, 1931.     L. P. WILLSEA     1,792,623
PAPER PRODUCTS MAKING MACHINE
Filed June 26, 1926     12 Sheets-Sheet 1
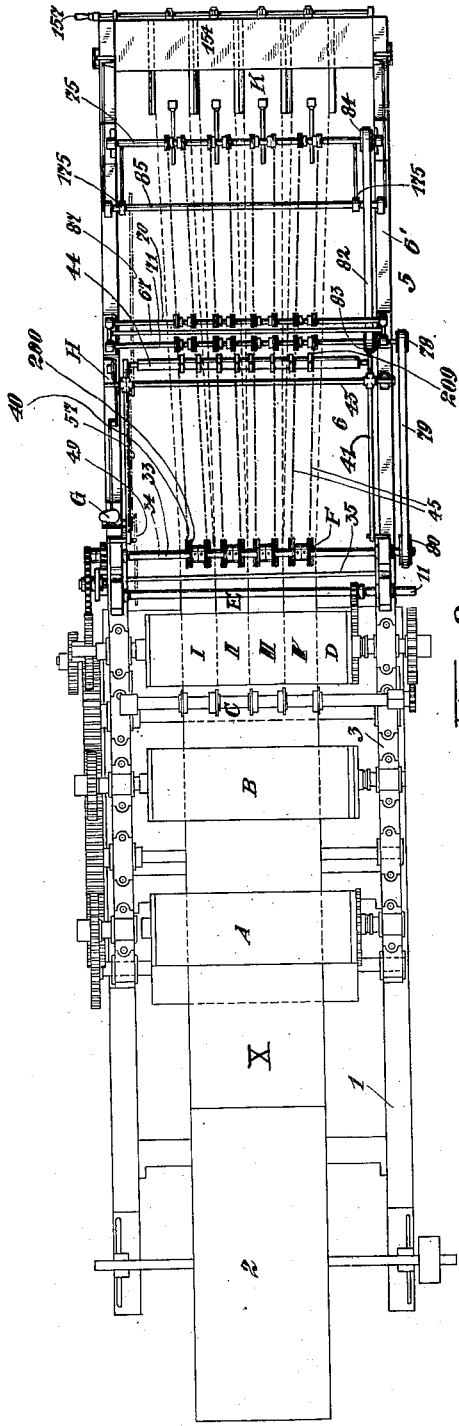
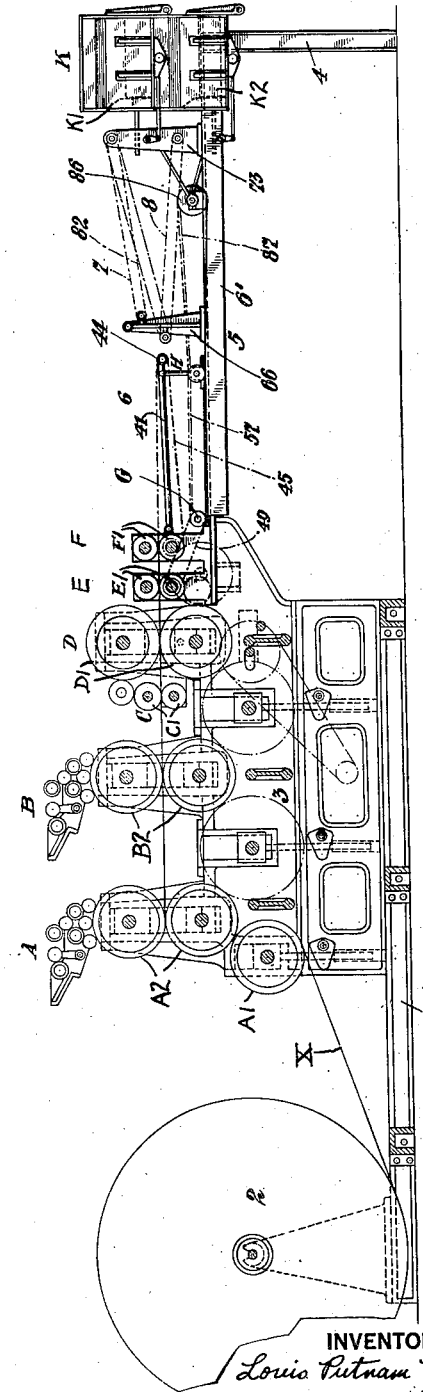
INVENTOR
Louis Putnam Willsea
BY
Albert M. Austin
ATTORNEY

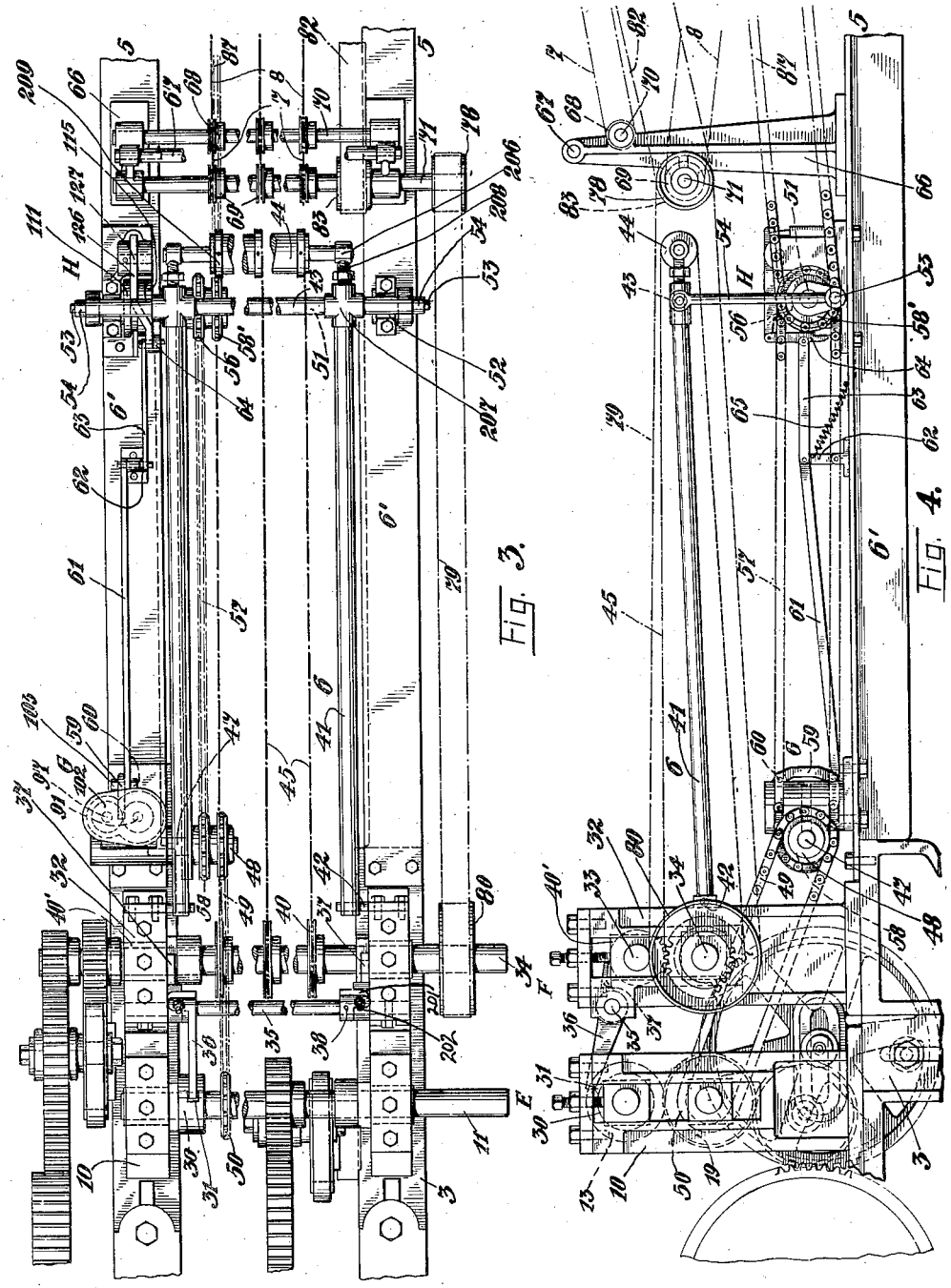

Feb. 17, 1931.  L. P. WILLSEA  1,792,623
PAPER PRODUCTS MAKING MACHINE
Filed June 26, 1926  12 Sheets-Sheet 3

INVENTOR
Louis Putnam Willsea
BY
Albert N. Austin
ATTORNEY

Feb. 17, 1931. L. P. WILLSEA 1,792,623
PAPER PRODUCTS MAKING MACHINE
Filed June 26, 1926 12 Sheets-Sheet 4

INVENTOR
Louis Putnam Willsea
BY
Albert M. Austin
ATTORNEY

Feb. 17, 1931.  L. P. WILLSEA  1,792,623
PAPER PRODUCTS MAKING MACHINE
Filed June 26, 1926  12 Sheets-Sheet 5

INVENTOR
Louis Putnam Willsea
BY
Albert M. Austin
ATTORNEY

Feb. 17, 1931.          L. P. WILLSEA          1,792,623
PAPER PRODUCTS MAKING MACHINE
Filed June 26, 1926     12 Sheets-Sheet 6

INVENTOR
Louis Putnam Willsea
BY
Albert N. Austin
ATTORNEY

Feb. 17, 1931.                L. P. WILLSEA                1,792,623
                      PAPER PRODUCTS MAKING MACHINE
                       Filed June 26, 1926      12 Sheets-Sheet 7

INVENTOR
Louis Putnam Willsea
BY
Albert N. Austin
ATTORNEY

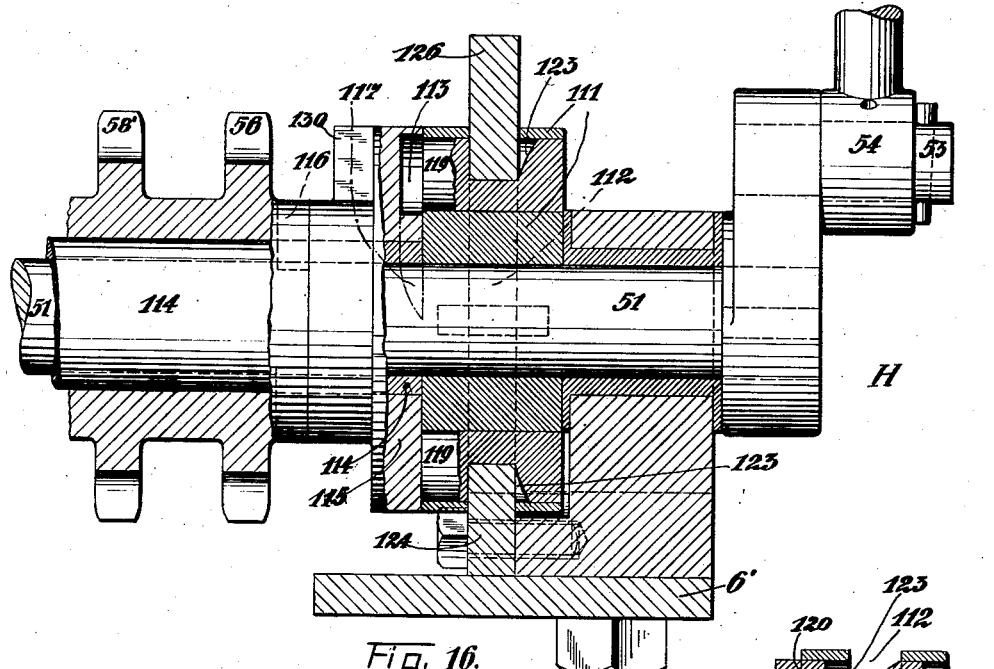
Fig. 16.
Fig. 18.
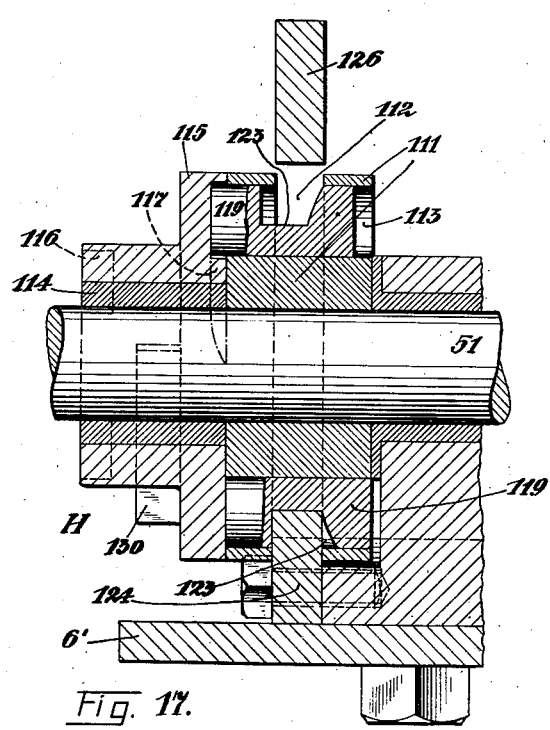
Fig. 17.
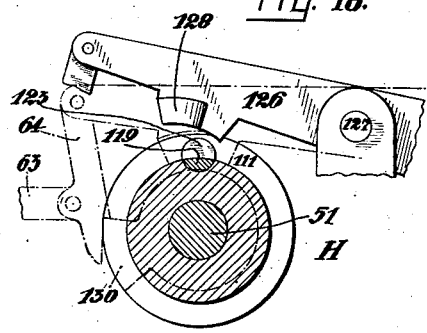
Fig. 19.
INVENTOR
Louis Putnam Willsea
BY
Albert M. Austin
ATTORNEY

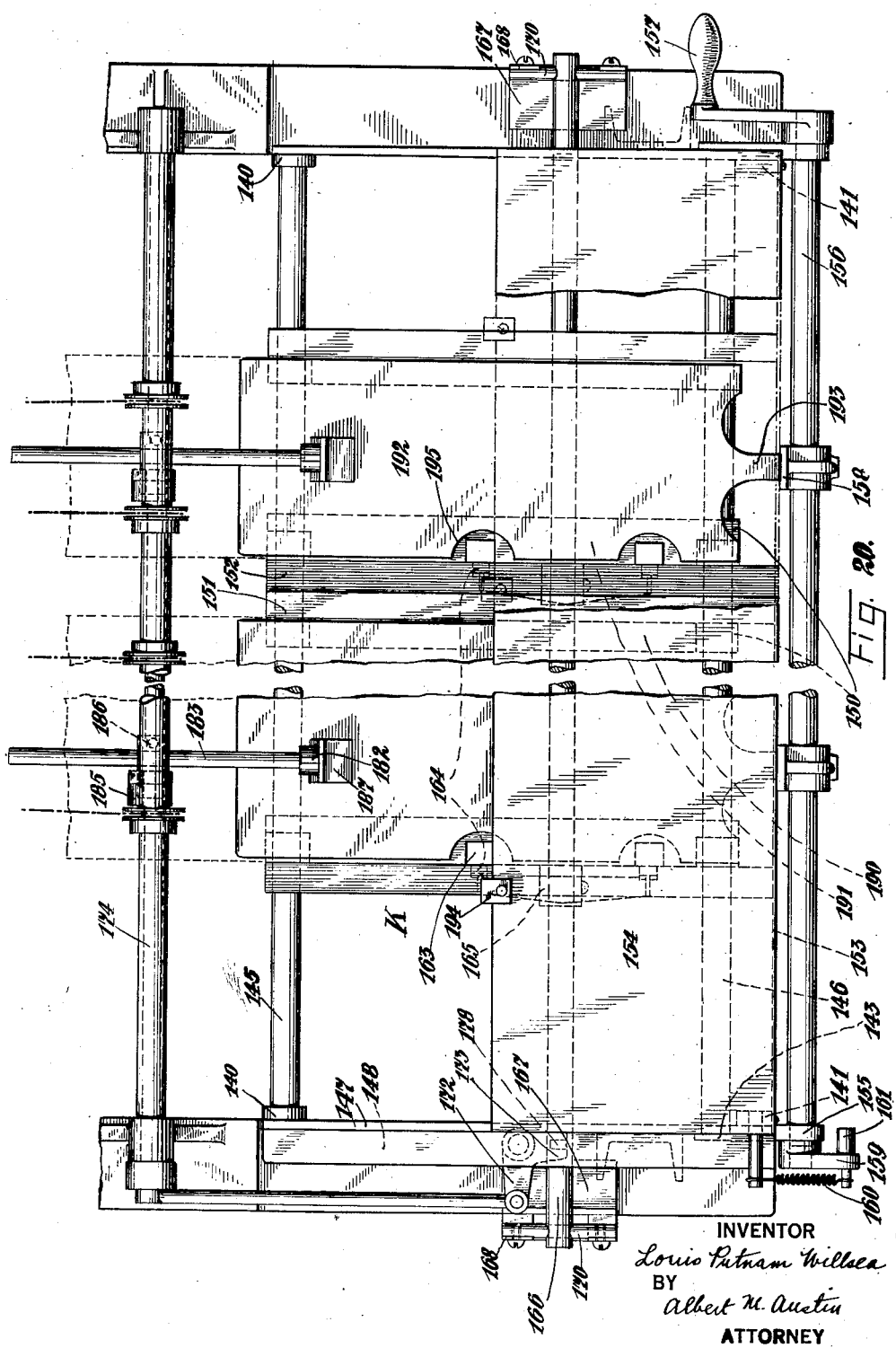

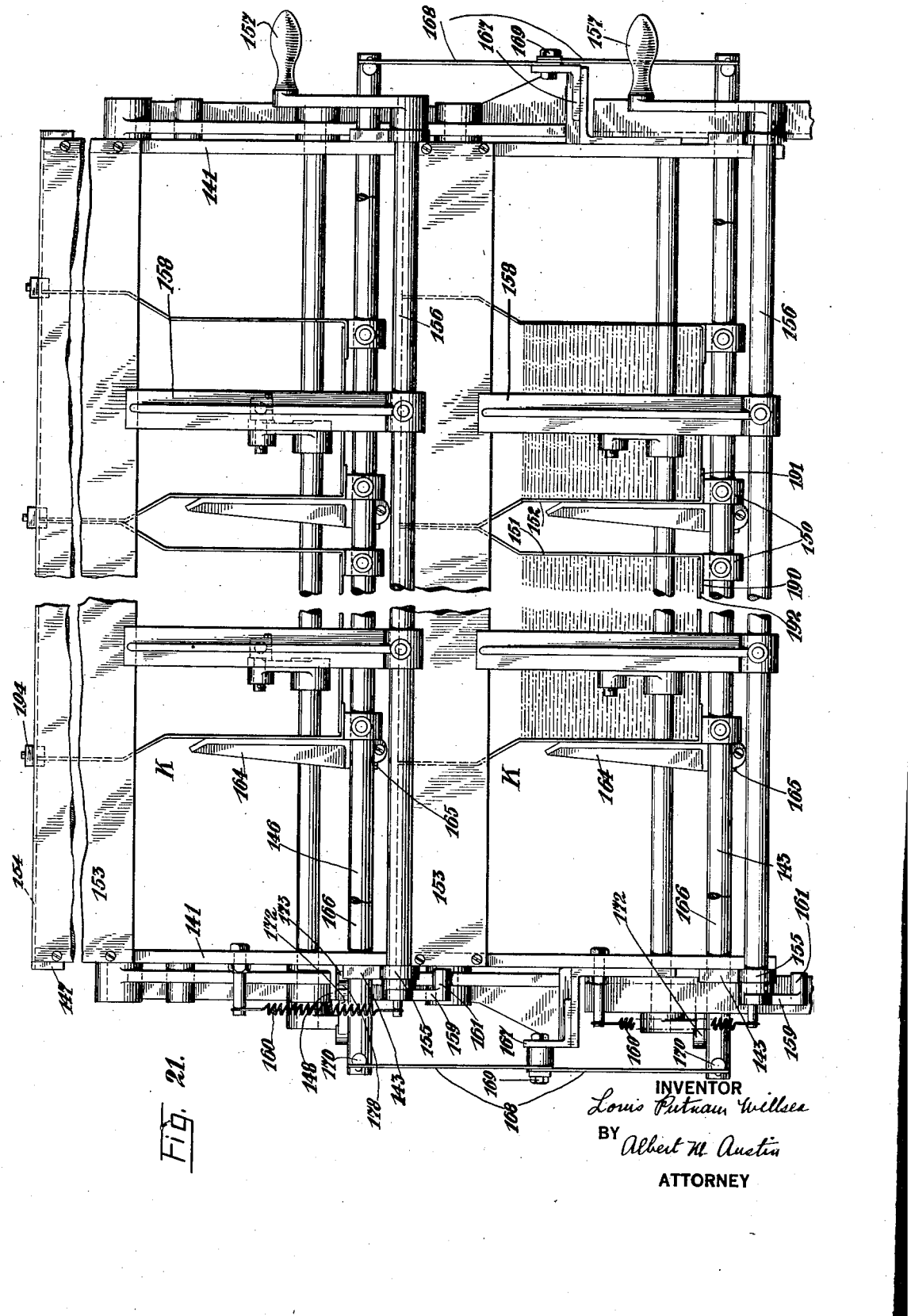

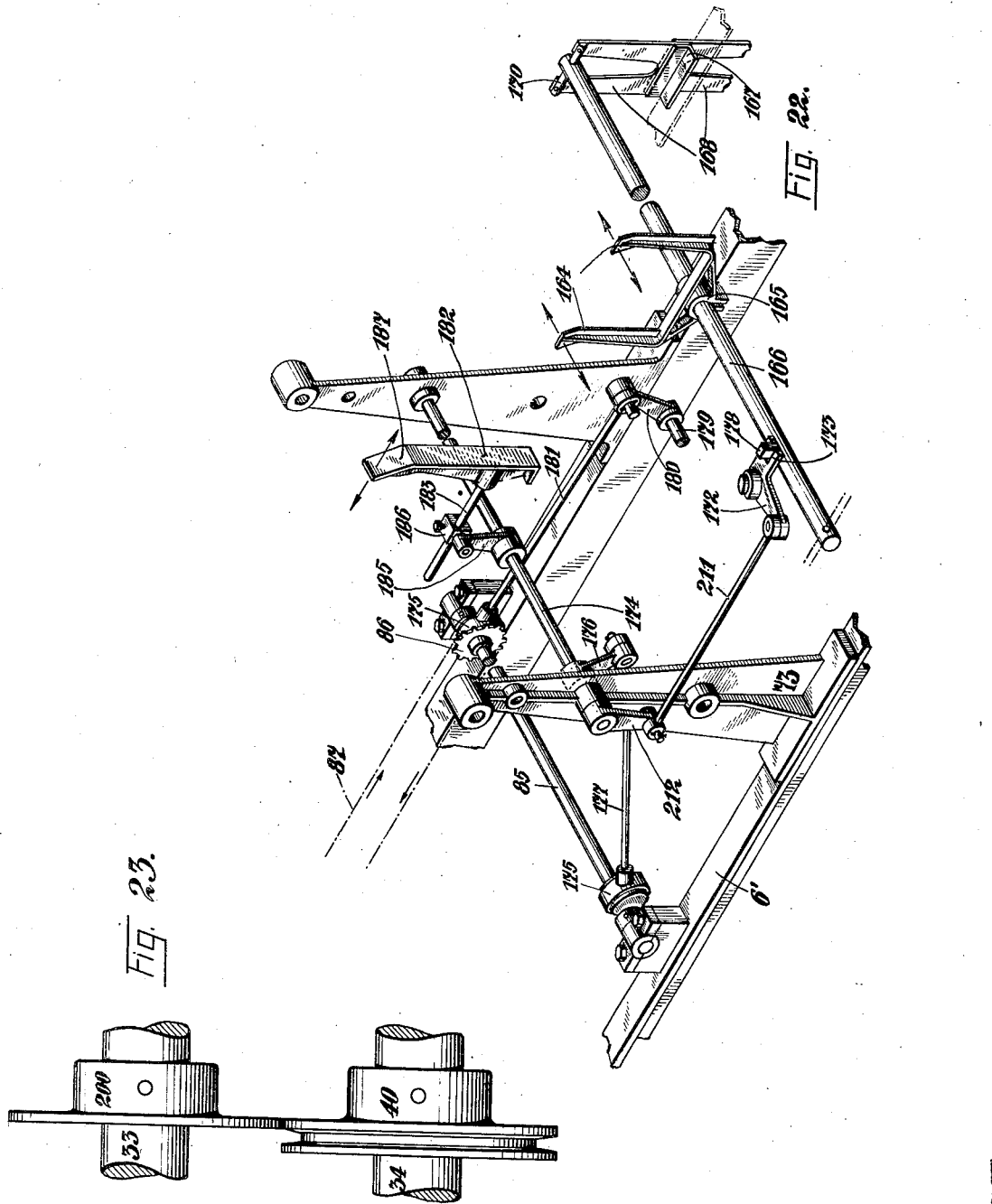

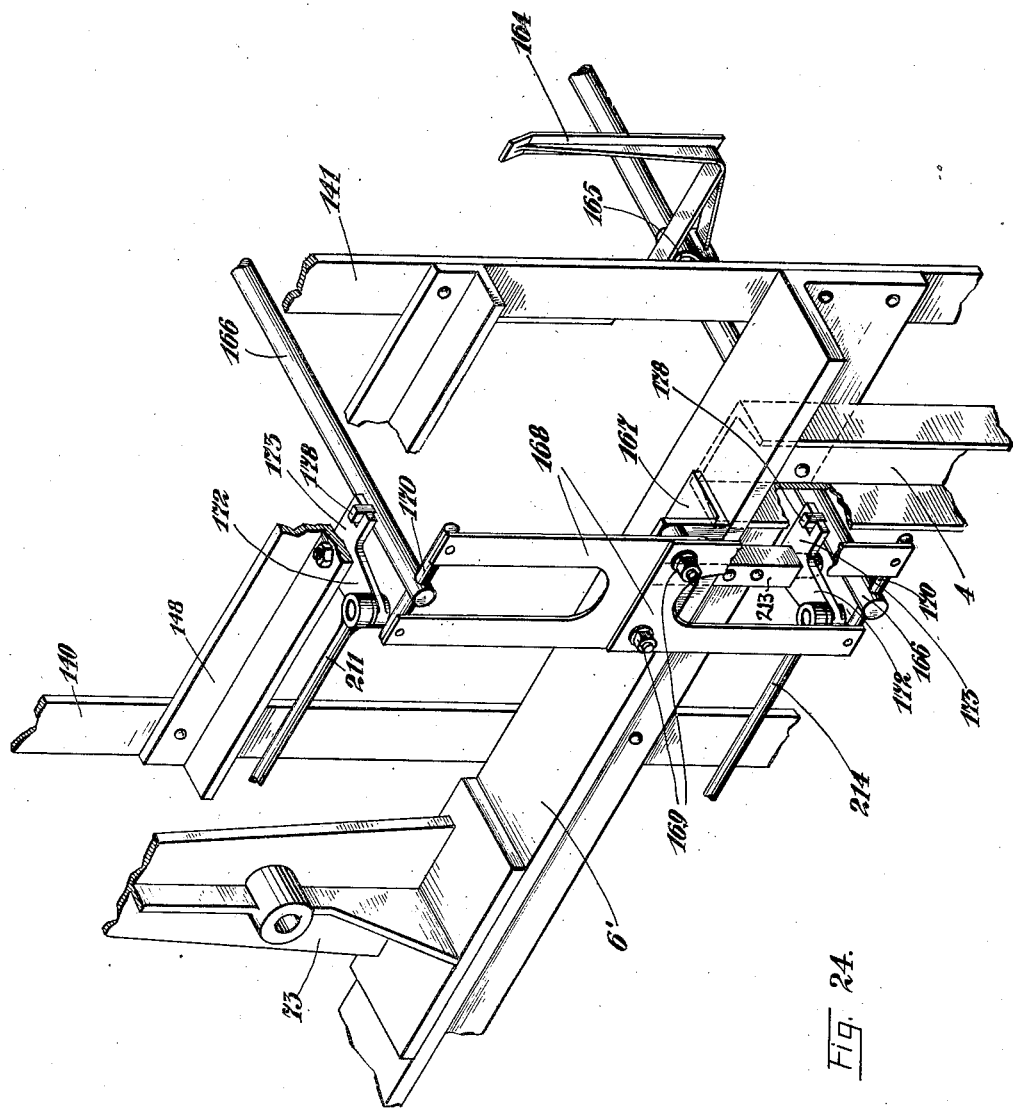

Patented Feb. 17, 1931

1,792,623

UNITED STATES PATENT OFFICE

LOUIS PUTNAM WILLSEA, OF ROCHESTER, NEW YORK, ASSIGNOR TO BOX BLANK CORPORATION, OF NEW YORK, N. Y., A CORPORATION OF DELAWARE

PAPER-PRODUCTS-MAKING MACHINE

Application filed June 26, 1926. Serial No. 118,636.

The invention relates to improvements in paper products making machines, and more particularly to a delivery mechanism which will deliver the products of the machine in counted piles accurately and quickly, the piles being delivered to convenient positions from whence they may be taken for further operation thereon.

The delivery mechanism may be used on any type of paper products making machine, as for instance, a paper box making machine or other machine where it is desired to have quick and accurate delivery of the product, but it is especially adapted to be used with a paper box making machine of the type which has the various mechanisms for performing the several functions necessary to change the web of paper board into a paper box blank, arranged in a straight line.

The arrangement of the several mechanisms for performing the different functions in the making of the product in a straight line allows the different functions to be performed very rapidly and close upon one another, so that the paper product is made in a minimum length of time. In machines of this type having all of the mechanisms arranged in a straight line a preferred construction is as follows: A main base frame is provided at one end of which may be mounted a large reel of the paper board. At the other end of the base frame may be mounted a main frame upon which the several printing mechanisms may be mounted, as well as the different scoring and cutting mechanisms and the picker and separator rolls. The several mechanisms may be arranged on the frame in the order in which they perform their operation upon the blank, and may be a first printing mechanism for printing one color; a second printing mechanism for printing a second color; advance or auxiliary rolls for making cuts and creases which extend throughout the entire length of the blank; die rolls on which cutting and creasing cleats are mounted for making all of the remaining necessary cuts and creases; picker rolls for picking out the small pieces which are waste; and separator rolls for separating the paper products one from the other.

At the forward end of the main frame may be provided a delivery table on which the delivery mechanism may be mounted, the construction of the delivery mechanism being one of the features of the present invention.

According to the invention, the delivery mechanism may comprise a movable carriage which may be pivoted to the separator roll standards and adapted to be moved to an upper and lower position by means of a half revolution clutch, which in turn may be controlled by a counter which causes the half revolution clutch to raise or lower the carriage at the proper time. The delivery mechanism may also comprise a distributing mechanism which may include distributing belts onto which the carriage may selectively deliver the paper products. The upper distributing belt may extend from the point of delivery from the carriage to an upper tier of delivery boxes, while the lower delivery belt may extend from a point of delivery to a lower tier of delivery boxes.

Suitable jogging mechanism may be provided for jogging the products delivered to the delivery boxes to insure that they settle down in position in even piles and without smudging the wet ink. The jogging mechanism places each product in even position on the pile and keeps the piles even. It is well known that wet ink smudges when it is attempted to even up a large pile of wet products arranged unevenly. The uneven condition of the piles and subsequent smudging is effectively prevented by never allowing the piles to become uneven. The piles are kept even by placing the arriving products in the delivery boxes initially in an even position. The even piles may then be taken from the delivery boxes and packed while the ink is wet, care being taken in packing to prevent relative movement between products to prevent smudging.

The delivery mechanism may be arranged so that while the upper distributing belt is delivering the products to the upper row of boxes the lower row of boxes may be emptied by a workman. After the upper row of boxes is filled, the carriage may shift to cause the lower distributing belt to deliver to the lower delivery boxes at which time the workman may manually empty the upper row of boxes.

The delivery must be fast, dependable and accurate, because otherwise the advantage of fast operation inherent in a machine of the straight line type would be lost. Therefore, the delivery mechanism must deliver the products very quickly and accurately, and must deliver them to predetermined positions in even piles of predetermined numbers. Any number of lines of products may be provided for in the delivery mechanism according to the invention, there being an upper and lower delivery box for each line. Furthermore, the paper products making machine, according to the invention, must be susceptible of changes according to the size of products, the number delivered per unit of time, and the number of lines of products. For instance, the printing rolls on the printing mechanisms and the die rolls must be easily removable, to be replaced by rolls of different sizes for different jobs so that in the particular job the circumference of each of the several impression rolls is substantially equal to the combined lengths of an integral number of products.

Various other objects and advantages of the invention will be obvious from the following particular description of one form of mechanism embodying the invention, or from an inspection of the accompanying drawings, and the invention also consists in certain new and novel features of construction and combinations of parts hereinafter set forth and claimed.

In the accompanying drawings I have shown for purposes of illustration one form of mechanism embodying the invention, in which Fig. 1 is a more or less diagrammatic assembly side view of the entire paper products making machine illustrating how the delivery is combined therewith;

Fig. 2 is a plan view of the machine shown in Fig. 1, and illustrating four lines of products being manufactured and delivered;

Fig. 3 is an assembly plan view of one part of the delivery mechanism showing the carriage and adjoining apparatus, middle parts being broken away to conserve space on the drawing;

Fig. 4 is an elevational view of the apparatus shown in Fig. 3;

Fig. 16 is an elevation mostly in section of the half revolution clutch taken on the line 16—16 of Fig. 14;

Fig. 17 is a section taken the same as Fig. 16 but showing the upper cam lever in raised position and one of the shoes of the clutch ring engaging the clutch disk;

Fig. 18 is a detail showing how the clutch shoes are mounted in the clutch ring;

Fig. 19 is a diagrammatic view to aid in understanding the operation of the half revolution clutch;

Fig. 20 is a top plan view of the jogging boxes, the middle portion being broken away to conserve space on the drawing;

Fig. 21 is an end elevation of the forward end of the jogging boxes, the middle portion being broken away to conserve space on the drawing;

Fig. 22 is a perspective view of part of the jogging mechanism, the middle portion being broken away to conserve space on the drawing;

Fig. 23 is a detail showing the construction of a single pair of separator wheels; and Fig. 24 is a perspective further illustrating the construction of the jogging boxes.

Figure 5:
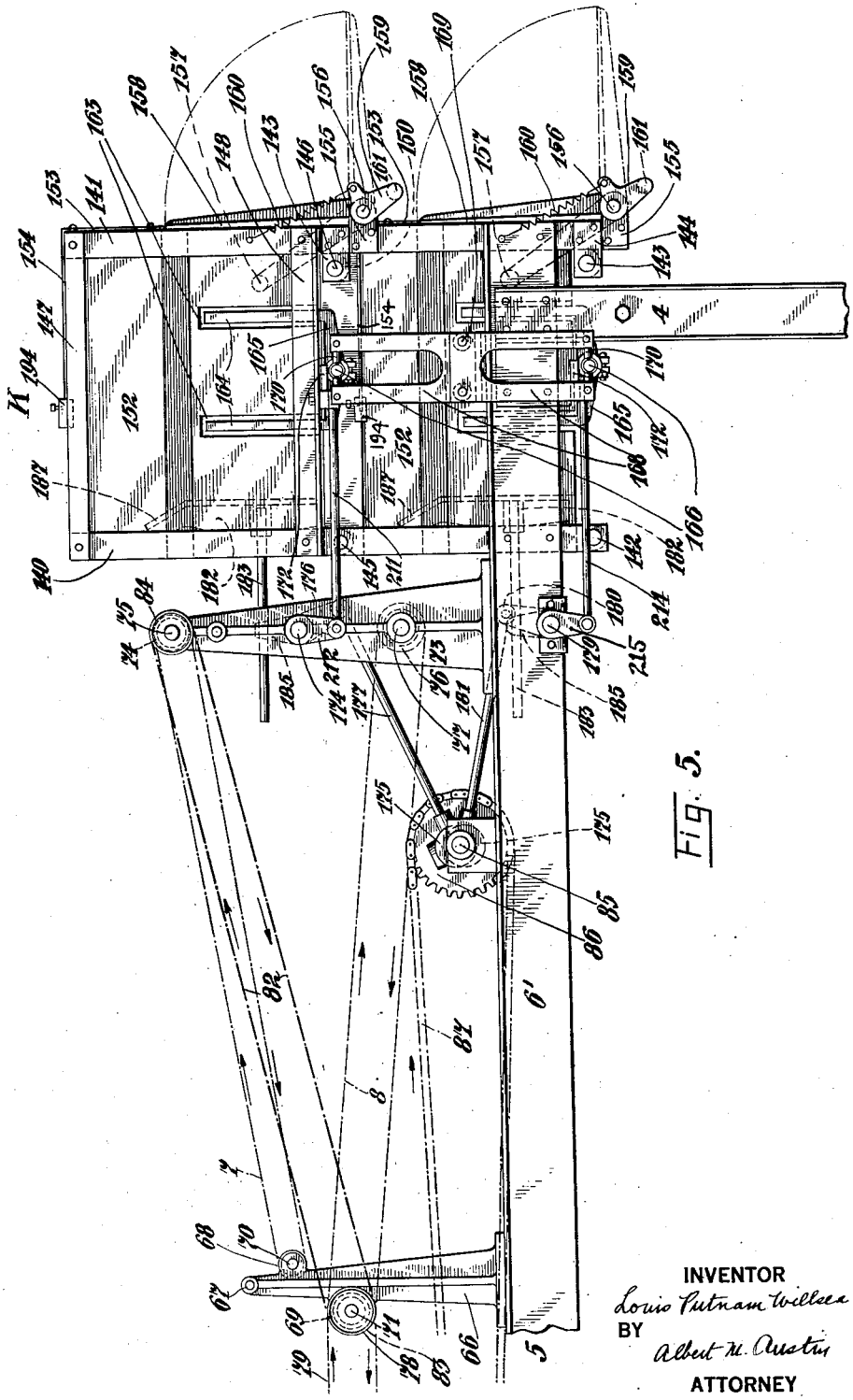
Fig. 5 is an elevation of the forward end of the delivery mechanism showing the distributing belts and the jogging boxes, this view being a continuation of the elevational view shown in Fig. 4.

In the following description and in the claims parts will be identified by specific names for convenience, but they are intended to be as generic in their application to similar parts as the art will permit.

Like reference characters denote like parts in the several figures of the drawings.

Referring now to the drawing and more particularly to Figs. 1 and 2, the paper products making machine may comprise a base 1, on the rear end of which may be placed the roll 2 of paper board from which the paper products are made. At the forward end of the base 1 may be the main frame 3 of the machine, on which may be mounted in the order named, printing mechanism A for printing one color; a second printing mechanism B for printing a second color; auxiliary or advance rolls C; die rolls D; picker rolls E for picking the small waste parts which are cut from the blank by the die rolls; separator rolls F which operate to separate the products, one from the other, after they have been operated upon by the preceding mechanisms, and the delivery mechanism denoted generally by L.

The paper web, denoted by X leaving the roll 2 may pass under a roll A1 and thence between the impression rolls A2 of the first printing mechanism A, where the first color is printed on the web. The web then passes between the printing rolls B1 of the second printing mechanism B, where it receives the second color. Thence the web passes between the knife wheels C1 of the advance rolls C, which make all the longitudinal continuous cuts and scores. The web then passes between the die rolls D1 which have cutting and scoring knives thereon for making all the remaining scores and cuts. The web then passes between the picker wheels E1 of the picker rolls E where the small undesired waste segments are picked out. These segments form no part of the desired products, and would interfere with the accurate delivery and even piling of the products if they were allowed to remain. The web then passes between the separator wheels F1 of the separator rolls F which operate to separate the products from the succeeding products. The products then pass onto the shifting carriage 6 which alternately delivers the products to the upper distributing belts 7 and to the lower distributing belts 8. The upper distributing belt 7 delivers products to an upper tier K1 of jogging boxes K, while the lower distributing belt 8 delivers products to a lower tier K2 of jogging boxes K.

Supported at one end by the main frame 3 and at the other end by legs 4 may be the delivery table 5. Mounted upon the delivery table 5 at the rear end thereof may be a counter G which may be driven by gearing from the picker rolls E. Mounted also on the delivery table 5 may be a half revolution clutch H which may be controlled by the counter and which operates to raise and lower the carriage 6 at appropriate times. Mounted also on the delivery table 5 may be standards between which distributing belts 7 and 8 may be run, the upper distributing belts 7 leading to an upper row of jogging boxes K, the lower distributing belts 8 leading to a lower row of jogging boxes from which the delivered products may be taken.

In the embodiment shown, four lines or products are made and delivered, the lines of products being defined by the dotted lines and denoted by I, II, III and IV in Fig. 2. The several belts which convey the lines of products are denoted by the dot and dash lines in Fig. 2.

*Picker rolls*

Figure 6:
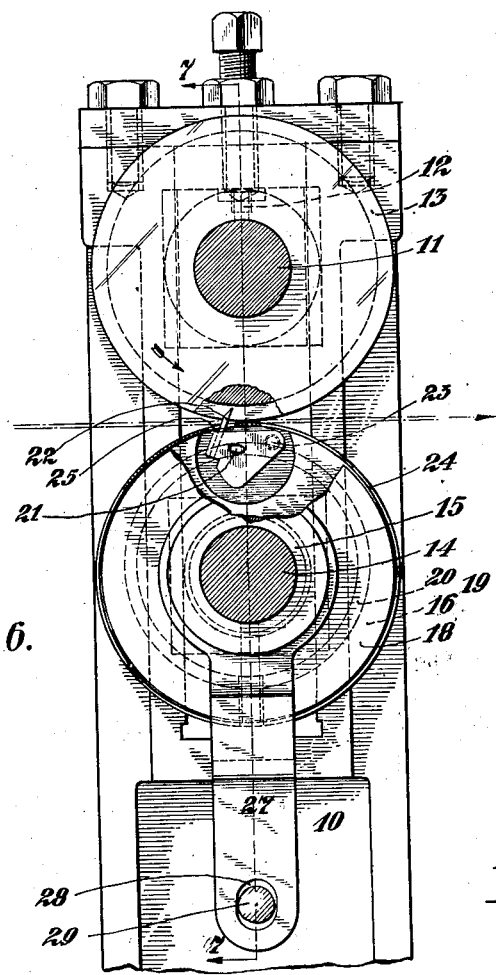
Fig. 6 is a section taken through the picker rolls and illustrating the construction of one pair of picker wheels.
Figure 7:
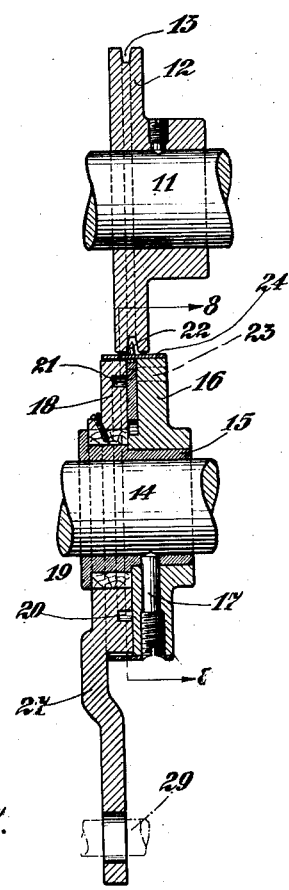
Fig. 7 is a vertical cross section taken through the axis of the picker wheels further illustrating the construction thereof.
Figure 8:
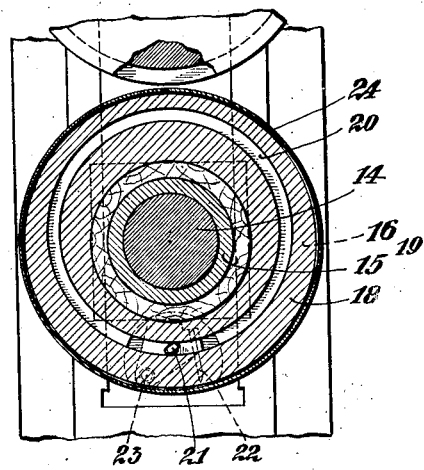
Fig. 8 is a section taken along the line 8—8 of Fig. 7 showing further details of the picker wheel construction.
Figure 9:
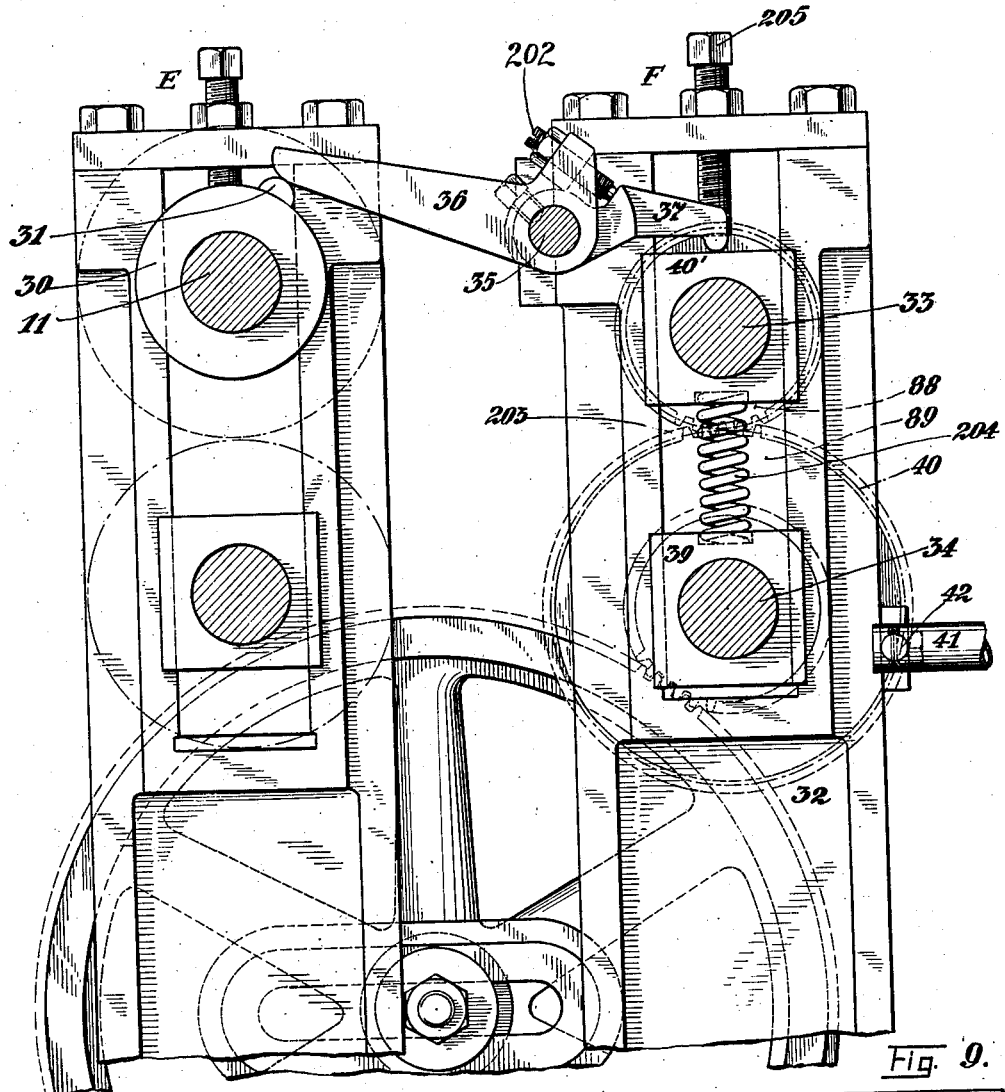
Fig. 9 is an elevation partly in section of the separator rolls and picker rolls illustrating how the operation of the picker rolls controls the relative position of the upper and lower separator rolls.
Figure 10:
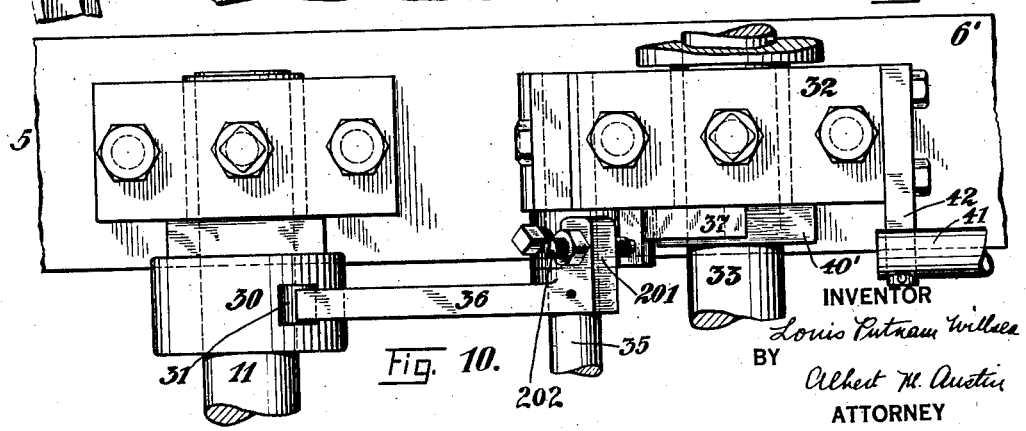
Fig. 10 is a fragmentary top plan view of the construction shown in Fig. 9.

Referring now to Figs. 6 and 7, the picker rolls may be mounted between suitable standards 10 supported on the main frame 3. Upper and lower picker shafts 11 and 14 may be provided extending the entire width of the machine and journalled in suitable bearings in the standards 10. A suitable number of pairs of picker wheels may be mounted on the picker shafts determined by the number of undesired particles of stock that must be ejected or picked out in the several lines of products present in the particular job. In the particular embodiment disclosed for the purpose of illustrating the invention two pairs of picker wheels are provided for each line of products.

The upper picker roll may comprise the upper shaft 11 having a plurality of wheels 12 each fixedly secured thereto as by means of a set screw, each wheel being capable of longitudinal adjustment on the shaft. Each picker wheel 12 may have a groove 13 in its periphery to accommodate the picker pin on the lower picker wheel of its pair.

The lower picker roll may comprise the shaft 14 having the male picker wheels 19 capable of longitudinal adjustment thereon. Each picker wheel 19 may comprise a flanged bushing 15 fixedly mounted on the shaft 14 as by means of a set screw 17. The picker ring 16 may be fixedly mounted on said bushing 15 by the same set screw 17, and a guide ring 18 may be mounted on the bushing 15 between the flange on the bushing and the picker ring 16. The guide ring 18 may have an eccentric groove 20 in its inner face to accommodate a guide pin 21 on the picker 22 which may be mounted in a recess in the side of the picker ring 16 by means of a pivot 23. A surface band 24 may be mounted on the picker ring 16 and may cover said guide ring 18, the band having a hole to allow the picker pin 25 mounted in the picker 22 to extend therethrough. The guide ring 18 may have an arm 27 with an elongated hole 28, through which a rod 29 may be passed which may be secured to the standards 10. The rod 29 also passes through the holes 28 in the arms 27 of all the pairs of picker wheels. Suitable gearing may be mounted on the picker shafts to cause the picker rolls to rotate and operate upon the web of paper board extending therebetween.

Thus it will be seen that, as the picker rolls rotate, the rotation of the male picker wheel 19 will cause the picker pin 25 to move back and forth from an outer position, as shown, to an inner position in which the picker pin is in a position below the surface band 24.

The picker rolls may be so geared that they make one revolution for each product, the picker pins of the several picker wheels projecting beyond the surface band 24 and into the grooves 13 on the upper wheels 12 to remove the undesired segments of stock.

Separator rolls

Referring now to Figs. 3, 4, 9, 10 and 23, the upper picker shaft 11 may have a collar 30 secured thereto, said collar having a projection 31 thereon. At the forward side of the picker rolls E may be the separator rolls F. These separator rolls may be supported between standards 32 rising from the main frame 3, the shafts 33 and 34 of the rolls being rotatably supported in suitable bearing blocks 40¹ and 39 in the standards. Suitable gearing may be provided including gears 88 and 89 on the shafts outside the standards to cause the separator rolls to rotate at a faster surface speed than the speed at which the paper board web passes between the rolls.

The upper separator roll comprises preferably a plurality of upper wheels 200 mounted on the upper shaft 33 and capable of axial adjustment thereon. The lower roll may comprise a plurality of lower wheels or pulleys 40 mounted on the lower shaft 34 and capable of axial adjustment on the shaft. In the particular embodiment shown eight upper wheels and eight lower wheels are provided making up eight pairs of separator wheels, two pairs for each line of products.

Pivoted between the standards may be a rod 35 provided at one end with a lever 36 pinned thereto and adapted to engage the projection 31 on the collar 30 of the upper picker shaft. Rigidly secured to the ends of the rod 35 as by set screws, are levers 37, one on each side, adapted to engage the bearing blocks 40¹ of the upper shaft 33. The lever 36 may be provided with an offset portion 201 having a set screw 202 engaging a shoulder on the adjoining lever 37. A collar 38 (Fig. 3) pinned to the rod 35 may have an offset portion 201 provided with a set screw 202 engaging a shoulder on the adjoining lever 37. This construction insures positive coaction between the lever 36 and levers 37 to cause the upper separator roll to be pressed downwardly at the proper times.

The upper bearing blocks 40¹ may be mounted between the guides 203 of the standards 32 so as to be vertically slidable. The lower faces of the upper bearing blocks 40¹ and the upper faces of the lower bearing blocks 39 each may be provided with a recess and a spring 204 may be positioned between each pair of upper and lower blocks in said recesses. The springs 204 continually urge the upper shaft 33 away from the lower shaft 34, the movement of the upper bearing blocks being arrested by limiting screws 205 which may be locked in position by lock nuts.

Each time the projection 31 contacts the end of the lever 36 the levers 37 will force the upper separator wheels 200 into firm engagement with the lower separator wheels 40 to cause the wheels to tightly grip the paper web, thereby causing the particular product gripped to travel faster than the preceding products, thereby separating it therefrom. It will be understood that normally the paper web traveling between the separator rolls moves comparatively free therebetween. The set screws 202 permit adjustment of the distance between separator wheels 40 and 200 when projection 31 and lever 36 causes the upper wheels 200 to aproach the lower separator wheels 40. The distance that the upper and lower rolls move relatively is so small that the effect of the separation of the gears 88 and 89 is negligible.

Since the gearing is arranged so that the picker rolls E make one revolution for each product in a line, it will be seen that the separator rolls are pressed together once for each product in the lines of product.

Delivery

Referring now to Figs. 3, 4 and 5, the delivery mechanism may comprise a table 5 made up of two longitudinally extending beams 6¹ in the form of angle irons, one end of each of which is supported by the main frame 3, the other ends being supported by legs 4. Pivoted at the forward side of the standards 32 of the separator rolls may be the shifting carriage 6, which may be made of a pair of longitudinal members 41, each suitably pivoted to its respective separator roll standard by means of a pivot rod 42, the carriage having a transverse member 43 near its free end suitably secured to the longitudinal members 41. The carriage may be advantageously made up of piping with pipe fittings 207 for connecting the various members. At the free end of the carriage between the longitudinal members 41, a roller 44 may be provided having trunnions journalled in bearings 206. Each bearing 206 may be provided with a threaded stud 208 slidably mounted in the adjoining fitting 207. Each stud 208 may have a lock nut which limits the backward movement thereof.

Positioned around the lower separator roll or pulleys 40 and the carriage roller 44, may be a plurality of thin conveyor belts indicated diagrammatically by 45, for carrying the products after they have been separated by the separator rolls. In the particular embodiment shown two belts 45 are provided for each line of products. A plurality of guide collars 209 may be provided, axially adjustable on the roller 44, to maintain the belts 45 in proper lateral position. Since the studs 208 are slidably mounted in the fittings 207, the conveyor belts 45 operate to limit the forward movement of the studs 208.

Secured to one of the longitudinal beams 6¹ of the delivery table may be the housing of the counter G, the housing having a horizontal transverse shaft 47 extending inwardly. This shaft may have secured thereto a pair of sprockets, the inner sprocket 48 having a drive chain 49 thereon extending to a sprocket 50 on the lower picker shaft. Secured to the same longitudinal beam 6¹ of the table 5 and substantially under the free end of the carriage 6 may be the housing of the half revolution clutch H. The half revolution clutch may have projecting therefrom a crank shaft 51 which extends the entire width of the table and is supported by a suitable bearing 52 on the other longitudinal beam. Overhanging crank pins 53 are positioned on the ends of the crank shafts 51, and connecting rods 54 connect the crank pins to the transverse members 43 of the shifting carriage. The half revolution clutch H has also a pair of sprockets on the shaft 51 on the inner side of the casing, the outer sprocket 56 being driven by a chain 57 passing also over the outer sprocket 58 of the counter G.

The counter G may have a bell crank lever 59 pivoted thereto at 60, the lower end of which has a link 61 pivotally connected thereto, the forward end of the link being pivoted to an upstanding link 62 whose lower end is pivoted to the longitudinal beam. A spring 65 may be provided connecting the upstanding link 62 to the frame of the half revolution clutch H to hold the finger 104 of the bell crank lever 59 in engagement with the notched wheels 95 and 100 as explained more in detail hereinafter. Pivoted also to the upper end of the upstanding link 62 is a reach link 63 whose forward end is pivoted to a swing lever 64 of the half revolution clutch H for controlling the position of the half revolution clutch.

In operation, after a predetermined number of products have been delivered with the shifting carriage in one position, the counter G will operate on the half revolution clutch H to cause the half revolution clutch to rotate one half revolution, thus changing the position of the shifting carriage from an upper to a lower position or vice versa, the shifting carriage being shown in Fig. 4 in its lower position delivering products to the lower distributing belt 8.

The distributing belt mechanism may comprise a pair of rear standards 66, one on each table beam, said standards being connected at their tops by a transverse rod 67. The rear standards may have a plurality of upper rollers 68 and a plurality of lower rollers 69 mounted therebetween on suitable shafts 70 and 71, the shafts being suitably journalled in the standards. The upper rollers 68 may be spaced forwardly of the lower rollers 69, and the lower rollers may be disposed in fairly close relation to the end roller 44 of the shifting carriage 6.

Forward standards 73, one on each table beam, may be provided, the said forward standards having a plurality of upper rollers 74 mounted on a shaft 75 journaled in the tops of the standards. Lower rollers 76 near the bottom of the standards may also be provided, being supported on a shaft 77 suitably journaled in the standards. A plurality of upper distributing belts 7 may connect the upper rollers, and a plurality of lower distributing belts 8 may connect the lower rollers. A pair of upper distributing belts 7 and also a pair of lower distributing belts 8 may be provided for each line of products. The upper rear rollers 68, lower rear rollers 69, upper forward rollers 74, and lower forward rollers 76 may be capable of longitudinal adjustment on their respective shafts.

The lower rear shaft 71 may project beyond the standard and may be provided with a pulley 78 which may be driven by a belt 79 from a pulley 80 mounted on the lower separator shaft 34 for driving the lower distributing belts 8. The upper distributing belts 7 may be driven by means of a drive belt 82 running on a second pulley 83 on the lower rear distributing shaft 71 and extending over the pulley 84 on the upper forward distributing shaft 75.

At the forward end of the distributing belts 7 and 8 may be the jogging boxes K, the upper distributing belt 7 delivering to an upper tier of boxes, and the lower belt delivering to a lower tier of boxes. These boxes are provided with suitable jogging mechanism and are described more in detail hereinafter. The jogging mechanism may be controlled by means of a shaft 85 mounted in bearings on the longitudinal table members, the shaft being provided with a sprocket 86 which may be driven by a chain 87, which in turn may be mounted on the inner sprocket 58¹ of the half revolution clutch H. An upper box and a lower box are provided for each line of products.

*Counter*

Figure 11:
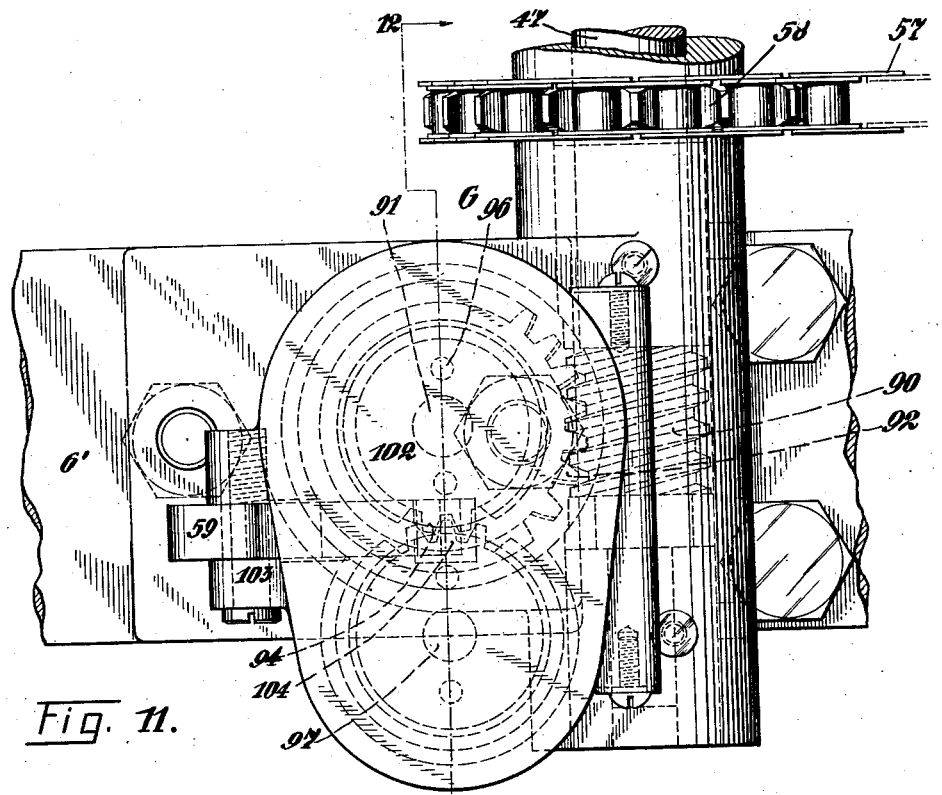
Fig. 11 is a top view of the counter.
Figure 12:
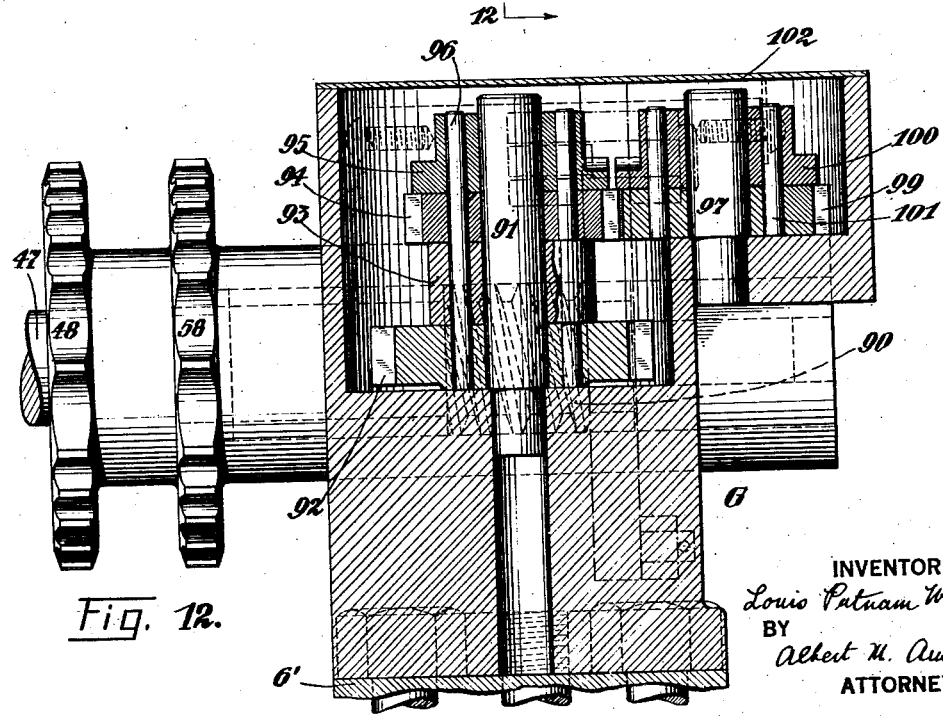
Fig. 12 is a section on the line 12—12 of Fig. 11 showing details of the counter construction.
Figure 14:
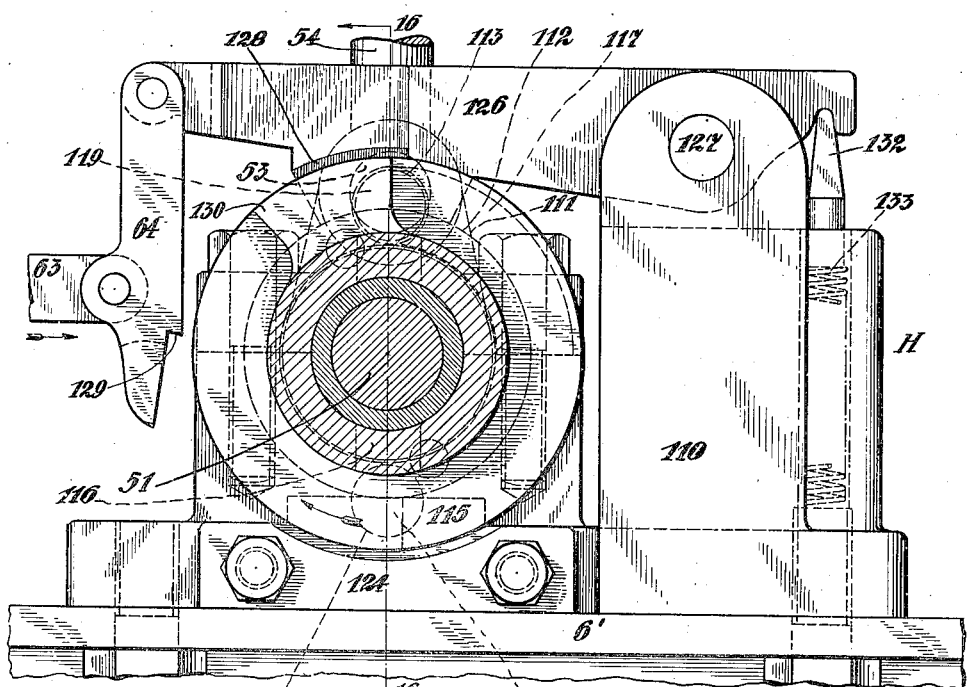
Fig. 14 is an elevation partly in section showing the half revolution clutch.
Figure 13:
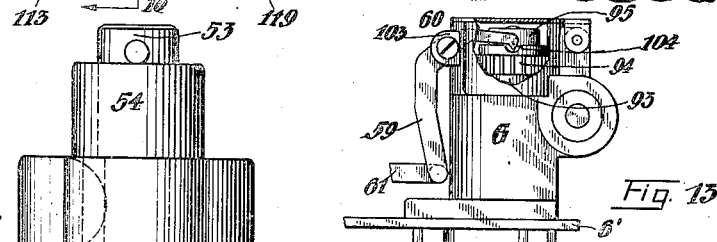
Fig. 13 is a detail showing how the bell crank lever of the counter cooperates with the remaining elements thereof.
Figure 15:
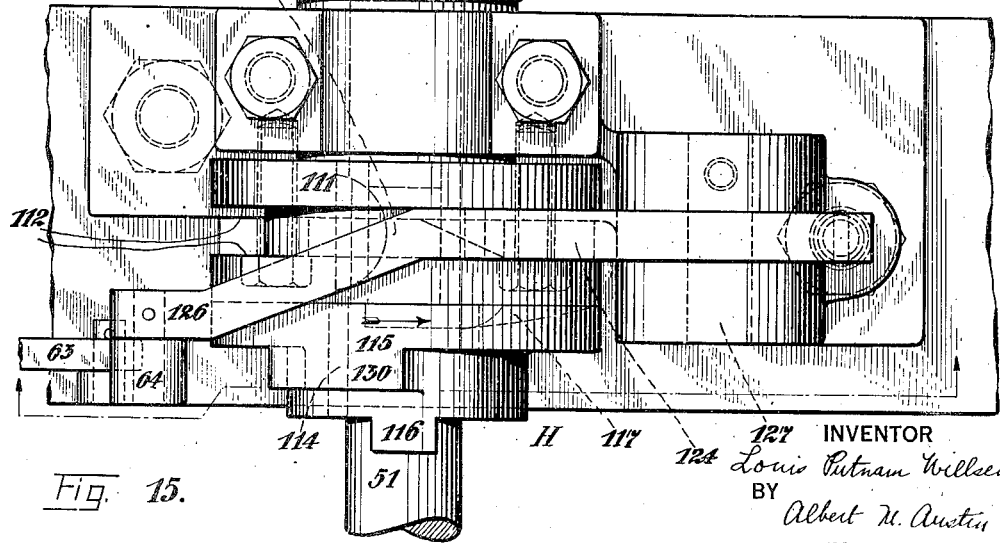
Fig. 15 is a plan view of the construction shown in Fig. 14.

Referring now to Figs. 11, 12 and 13, the counter G may comprise a casing suitably secured to one of the table beams by means of holding down bolts. The casing may have a transverse shaft 47 journalled therein, the transverse shaft having a pair of rigidly connected sprockets 48 and 58 rigidly secured thereto. Mounted on the transverse shaft 47 within the casing may be a worm 90, the casing being provided with suitable bearings for the shaft 47.

The counter may be provided with a vertical shaft 91 having a worm wheel 92 which is driven by a worm 90. Mounted on the vertical shaft above the worm wheel may be in order, a spacing collar 93, a spur gear 94 and a notched wheel 95, all being suitably pinned together by pins 96. A second vertical shaft 97 is provided mounted at its lower end in a horizontal wall of the casing, and is provided with a spur gear 99 meshing with the spur gear 94 on the first vertical shaft and having a notched wheel 100 pinned thereto by pins 101. The top of the casing may be provided with a cover 102 which is hingedly connected to the body of the casing, which cover may be lifted to expose the several gears and members in the casing. It will be understood that these members may be removed and other gears introduced to vary the number of products which may be counted before the half revolution clutch is shifted.

Pivoted to a lug 103 projecting from the side of the casing is a bell crank lever 59, the horizontal portion thereof ending in a finger 104 which is adapted to engage in the notches in the upper surface of the notched wheels 95 and 100 whenever the notches register. The lower end of the bell crank lever 59 is connected to the longitudinal link 61. It will be appreciated that at predetermined intervals depending upon the kinematic values of the chain of gears, the notches will come into register and the spring 65 will cause the finger 104 to drop thereinto to operate the half revolution clutch. At other times the finger rides on the smooth surface of the notched wheels 95 and 100, and its position is unaffected by a single notch only passing thereunder.

*Half revolution clutch*

Referring now to Figs. 14, 15, 16, 17, 18 and 19, the half revolution clutch H may comprise a frame 110 secured to one of the longitudinal table beams by holding down bolts. A crank shaft 51 may have bearing in the frame 110, said crank shaft extending all the way across the delivery table and being supported in a suitable bearing 52 on the other longitudinal table beam. The crank shaft may be provided with overhanging crank pins 53 at its outer ends, the overhanging crank pins having connecting rods 54 which extend to the free end of the shifting carriage 6.

A clutch ring 111 may be affixed to the shaft 51 as by means of a key, said clutch ring having an annular peripheral groove 112 and axial transverse holes 113 therethrough intersecting the groove 112, said holes 113 being spaced 180 degrees apart. A pair of drive sprockets 56 and $58^1$ having a projecting sleeve 114 may be loosely mounted on the crank shaft. A clutch disk 115 may be mounted on the projecting sleeve and may have interlocking engagement by means of interlocking lugs 116 with the drive sprockets.

The side of the clutch disk 115 facing the clutch ring may have an annular groove 117 extending quarter way around the disk, and having one end ending in an abrupt shoulder, the other end of the groove ending in a gradual slope to the smooth outer surface of the disk, as best shown in Fig. 16. A pair of clutch shoes 119 may be mounted in the longitudinal holes, each clutch shoe having a transverse hole 120 in which may be mounted one end of an L-shaped pin 121, the L-shaped pin being mounted in a longitudinal hole which seats a spring 122 surrounding the pin. This spring continually urges the shoes toward the clutch disk. The shoes 119 may be provided in their side walls with notches 123, one side of the notches constituting a cam face.

On the lower side of the frame 110 under the clutch ring 111 a cam member 124 may be bolted, fitting in the annular groove 112. At the top of the clutch ring 111 may be mounted a cam lever 126 pivoted to the frame by means of a pivot pin 127, and having a cam surface 128 to cooperate with the cam surfaces on the shoes 119. A swing lever 64 may be pivoted by a pivot pin to the free end of the cam lever 126, and may have a shoulder 129 for engagement with a projection 130 mounted on the clutch disk. A reach link 63 may be pivoted to the swing lever 64 near its lower end, the reach link being adapted to swing the swing lever so as to place the shoulder 129 in proper position so that the projection 130 may engage the shoulder at the proper instant. At the forward end of the cam lever 126 may be a notch in which may fit a pin 132 which is seated in a hole in the frame, the pin 132 being urged by a spring 133 to normally hold the cam lever 126 in engagement in the annular groove 112 on the clutch ring 111.

When the parts of the half revolution clutch are in normal position as, for instance, when the carriage 6 is in its upper position as shown in Fig. 16, the reach link 63 holds the swing lever 64 away from the projection 130 and the cam lever 126 has its cam surface engaging the cam surface of one of the clutch shoes 119 to hold the clutch shoe out of engagement with the clutch disk 115, the lower cam member 124 also having its cam surface engaging the cam surface of the other clutch shoe to hold it out of engagement with the clutch disk 115. It will be understood that the sprocket member rotates continuously, driving with it the clutch disk 115. Therefore, since there is no driving connection between the clutch disk 115 and clutch ring 111, and since both the clutch disk 115 and sprockets 56 and $58^1$ are freely mounted on the crank shaft, the crank shaft will not be moved and the carriage will be held in its upper position, as shown in Fig. 16.

At the proper time when the notches in the notched wheels 95 and 100 of the counter G register, the finger 104 of the bell crank lever 59 will drop into the depression formed by the registering notches, and will cause the link members 61, 62 and 63 to move longitudinally forward to cause the shoulder 129 on the swing member 64 to engage with the projection 130 which is continually rotating. The projection will compel the swing member to travel upwardly and will lift the cam lever 126 out of engagement with the clutch shoe, allowing the clutch shoe to bear against the clutch disk 115 and to spring into the annular groove 117 thereon against the abrupt shoulder at the end of the groove, thereby causing the clutch disk 115 to drive the clutch ring 111, thereby lowering the shifting carriage 6.

The clutch disk 115 will continue to drive the clutch ring 111 until the carriage 6 is in its lower position. Before the carriage attains its lower position, however, the projection 130 on the clutch disk will have ridden out from under the shoulder 129 on the swing lever and the cam lever 126 will have dropped to its lower position in the annular groove 112 on the clutch ring 111, and will engage the cam surface of the next clutch shoe 119 to disengage the clutch shoe from the clutch disk 115. When the clutch shoe which has been engaged in the groove 117 of the clutch disk 115 reaches its lower position the lower cam member 124 fixed to the frame will engage the cam surface of this shoe to pull the shoe out of the groove 117.

Thus when the carriage 6 is in its lower position both shoes will be held from contacting the clutch disk 115 and the clutch disk is free to rotate without driving the clutch ring. At the same time the stationary cam member 124 on the frame and the cam lever 126 operate to hold the clutch ring 111, and therefore the crank shaft 51 in a stationary position, in which position it is held until the counter G again causes the shoulder of the swing lever 64 to be brought into position where the projection 130 on the clutch disk may engage it.

*Jogging boxes*

Referring now to Figs. 5, 20, 21, 22 and 24, the jogging boxes K may comprise a pair of rear columns 140, one column being secured to the inner face of each angle iron table beam 6¹ and a pair of forward columns 141, each of which is secured to the inner face of a table beam. A rear lower supporting rod 142 may be provided to connect the rear columns below the table beams and a forward lower supporting rod 143 may be provided to connect offset pieces 144 on the forward columns below the table beams; similarly a pair of upper supporting rods 145 and 146 may connect each pair of forward and rear columns near the middle thereof. Longitudinal upper cross members 147, one on each side, may be provided to connect the columns secured to the same table beam 6¹ at the tops of the columns. Longitudinal lower cross members 148 in the form of angle irons, one on each side, may connect the columns secured to the same table beam 6¹ just above the upper supporting rods 145 and 146.

A plurality of lower boxes may be provided made from sheet metal, and may rest upon the lower supporting rods 142 and 143. Similar boxes may be provided resting upon the upper supporting rods 145 and 146. The adjoining sides 151 and 152 of adjoining boxes may be spaced from each other at the lower parts of the boxes, the sides being inclined and meeting at the upper portion of the boxes. Each box, therefore, has its upper portion larger than its lower portion. The sides 151 and 152 of each box have their lower ends bent in to form seats 190 and 191 to which are secured collars 150 which in turn are mounted on the respective supporting rods so as to be longitudinally adjustable thereon. Resting upon the seats 190 and 191 may be plates 192 forming the bottoms of the boxes, said plates having hand grasping portions 193 by which the plates 192 may be pulled forward with their superimposed piles of products when the door bars 158 are in their lower position.

Transverse stop plates 153 may be provided extending clear across the rows of boxes, the stop plates being secured to the forward columns 141 at the upper portion of each row of boxes. Each stop plate 153 may have secured thereto, and preferably integral therewith, a roof plate 154, extending across the rows of boxes and suitably secured to the sides 151 and 152 by clamps 194.

Below each row of boxes and journalled on supporting pieces 155 secured to the forward columns may be an operating rod 156 having a handle 157 secured thereto. A plurality of door bars 158, one for each box, may be secured by collars provided with set screws, to the operating rods so as to be capable of longitudinal adjustment thereon, the door bars extending up to the stop plates 153 to effectively prevent the finished products from being discharged out of the forward ends of the boxes when the door bars 158 are in their upper position. On one end of each operating rod 156 is an L-shaped member 159 to one end of which a spring 160 may be secured, the other end of the spring being connected to an adjacent column. The other end of the L-shaped member may have a lateral projection 161 which is adapted to engage the supporting piece 155 to limit the throw of the door bars 158. The handles 157 may be operated to move the door bars 158 to a horizontal position as indicated by the dotted lines in Fig. 5. It will be noted that, due to the position of the L-shaped members 159, when the door bars 158 are in their horizontal position, the springs 160 will operate to hold them in such position, the door bars 158 being limited in their movement by the projection 161 engaging the supporting pieces 155.

At the same side of each box, the side walls 152 and adjoining seats 191 may be provided with a pair of slots 163 to accommodate the side jogging bars 164. Furthermore, the bottom plates 192 may have notches 195 to allow free movement of the side jogging bars 164. The side jogging bars may be made of some light material such as aluminum. Each pair of side jogging bars 164 for a given box may be connected at their lower portion by a yoke 165. Upper and lower side jogging shafts 166 may be provided under the respective tiers of boxes extending laterally between the ends of the boxes. The yokes 165 may be secured to their respective side jogging shafts 166 by split collars so as to be longitudinally adjustable thereon. Located between the upper and lower side jogging shafts on each side may be an angle iron 167 secured to the respective table beams. Secured to each angle iron 167 may be a pair of U-shaped spring members 168, the bases of the members overlapping and being connected to the angle iron by means of bolts 169, the free legs of the spring members being secured to rods 170 which extend through the respective side jogging shafts 166, thereby supporting the side jogging shafts 166.

The upper side jogging shaft 166 may be oscillated longitudinally by a bell crank lever 172 which may be pivoted to the longitudinal angle iron 148, one arm 173 of the bell crank lever being forked to engage a projection 178 on the side jogging shaft 166. The other arm of the bell crank lever 172 may be connected to a connecting rod 211 which in turn may be connected to a crank arm 212 on the upper rocker shaft 174. In a like manner the lower side jogging shaft 166 may be oscillated longitudinally by a lower bell crank lever 172 which may be pivoted to a strip 213 depending from the table beam 6¹, one arm 173 being forked to engage a projection 178 on the lower side jogging shaft 166, the other arm of the bell crank lever being connected to a connecting rod 214 which in turn may be connected to a crank arm 215 on the lower rock shaft 179.

Mounted in back of the jogging boxes K and in back of the forward standards 73 of the distributing belts may be a shaft 85 having a sprocket 86 which is driven by a chain 87 leading from the sprocket 58¹ on the half revolution clutch H. This shaft is suitably supported on the table beams, and has an eccentric 175 on each side. Journalled in the forward standards 73 of the distributing belts is an upper rocker shaft 174 which has a lever 176 secured thereto, the end of the lever being connected to a sheave on one eccentric 175 by means of an eccentric rod 177. Below the upper rocker shaft 174 may be a lower rocker shaft 179 secured in bearings in the beams of the table. The lower rocker shaft 179 has a lever 180 rising therefrom and is connected by an eccentric rod 181 to the sheave on the other eccentric 175.

In the back of each jogging box is an end jogging bar 182 which rests on the floor of the box. The end jogging bars are made of some light material such as aluminum, and have comparatively large bases to prevent wearing the floors of the boxes. The end jogging bars 182 are connected by rods 183 to levers 185 connected to the respective rocker shafts 174 and 179, the position of the end jogging bars 182 being adjustable by means of adjustable clamps 186 on the ends of the rocker levers 185. The levers 185 are longitudinally adjustable on the rocker shafts 174 and 179. Thus it will be seen that the rotation of the eccentric shaft 85 will cause the rocker shafts 174 and 179 to rock, which in turn will cause the end jogging bars 182 to be oscillated back and forth, and furthermore cause the side jogging bars 164 to be oscillated back and forth against the tension of the U-shaped springs 168.

It will be noted that the flaring upper portions of the sides 151 and 152 and the outwardly extending upper portions 187 of the end jogging bars 182 operate to effectively receive and guide the products delivered by the distributing belts 7 and 8. Thus the products which may still have wet ink thereon may be piled, counted and taken out of the jogging boxes without ruining the products by smudging the wet ink. The movement of the jogging bars will be adjusted so that desired jogging action is obtained to cause the products to settle into the boxes evenly and smoothly without causing the wet ink on the products to smudge.

Under normal conditions with the various mechanisms of the machine performing their respective functions, the lines of paper products travel from the rear end of the machine to the forward end. The belts 45 on the shifting carriage will move continuously, as well as the distributing belts 7 and 8. The end jogging bars 182 and side jogging bars 164 will oscillate continuously. The shifting carriage 6 will move intermittently from an upper position at which position it will deliver products to the upper distributing belts 7 to be delivered to the upper tier of jogging boxes, to its lower position to deliver products to the lower distributing belts 8 to be delivered to the lower tier of jogging boxes. The counter G will control the interval between the times the half revolution clutch H shifts the carriage 6 from one position to the other.

It will be appreciated that the speed at which the products are delivered the carriage 6 must shift very quickly. It will be noted that the end of the shifting carriage moves to a position much closer the lower rear distributing shaft 71 than to the upper rear distributing shaft 70. Furthermore, the upper rear rollers 68 are smaller than the lower rear rollers 69.

This construction is for the purpose of preventing the products from impinging against the upper rollers 68 when the carriage 6 changes position. Since it takes an appreciable interval of time for the carriage 6 to move from its lower position to its upper position, the first product to be delivered to the upper belts 7, after the last product is delivered to the lower belts 8, advances on the belts 45 on the carriage 6 during the movement of the carriage to its upper position. It is of utmost importance, therefore, to make the movement of the carriage as small as possible; hence the upper rear rollers 68 are made small. It is of utmost importance also to provide a gap between the carriage 6 and the upper rollers 68 small enough for the products to jump but large enough to allow for the advanced position of the first product to be delivered to the upper belts 7.

Similarly, the first product to be delivered to the lower belts 8, after the last product has been delivered to the upper belts 7, advances on the belts 45 on the carriage 6 during the movement of the carriage to its lower position. The large gap above mentioned together with the small size of the upper rollers 68 allows the first product to be delivered to the lower belts 8 to clear the rollers 68.

It will be understood that the gearing connecting the several rolls and other mechanisms will be arranged so as to properly synchronize the several operations. For instance, the impressions made by the printing mechanisms A and B on the blank paper web must bear proper relation to the impressions made by the advance rolls C and die rolls D, and also the operation of the picker rolls E, separator rolls F and the delivery must bear a proper relation to the work.

As above stated, a predetermined number of products will be fed to the upper tier of boxes K which will depend upon the number desired, at which time the carriage 6 will shift so that a predetermined number will be delivered to the lower tier of boxes. While the delivery mechanism is filling one of the tiers of boxes the other tier will be emptied by a workman.

In the illustration of the machine given, the machine is set up for turning out four lines of products. It will be appreciated that according to the invention, a machine may be provided to deliver any number of lines of products, and it will also be obvious that a lesser number of lines than the maximum for which the machine is designed, can be delivered.

To set the machine up for different jobs requiring a different number of lines of products and lines of different widths, it will be understood that the wheels of the advance rolls, the picker wheels, the several conveying belts and pulleys, the width and number of jogging boxes, the positions of the jogging bars and other elements all may be easily changed to meet the exigencies of the new job with a minimum amount of labor and time. Furthermore, the gearing may be adjusted so that the picker rolls will make one revolution for each product. The gearing in the counter may be changed to operate the shifting carriage to deliver the desired predetermined number of finished products to each tier of boxes.

Furthermore, the machine may be arranged so that the several impression rolls of the printing mechanism and the die rolls may be easily removable, to be replaced by rolls of different diameters to meet the exigencies of different jobs in order to maintain the relation that the impression circumference of each cylinder equals the combined lengths of an integral number of products. Also the gearing must be so arranged so as to be easily replaceable by different size gears to conform to the different diameters of cylinders.

Thus a paper products making machine is provided having a delivery which is fast, accurate and efficient. Positive delivery of the products in counted piles is insured from any number of lines of products. Furthermore, products may be piled in the receiving boxes without smudging the wet ink thereon. Also the width and number of lines may be very easily changed, thereby lending great convenience for use in establishments where the length of any one job is rather limited and therefore frequent changing of the parts of the machine is necessary for the different jobs.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

Having thus described my invention, I claim:

1. Delivery mechanism for a paper products machine comprising a pair of standards, picker rolls journalled between said standards, a second pair of standards, separator rolls, journalled between said second standards, a carriage pivoted to said second standards, a half revolution clutch on said table under the free end of said carriage, a counter on said table, a lower tier and an upper tier of boxes on the forward end of said table, means for moving said carriage periodically by said clutch, devices for controlling said counter by said picker rolls, devices for controlling said clutch by said counter, and means whereby said carriage may deliver to said upper tier of boxes when in its upper position and to said lower tier of boxes when in its lower position.

2. Delivery mechanism for a paper products machine comprising a main frame, a table supported at its rear end by said frame, legs supporting said table at its forward end, a pair of standards on said frame, picker rolls journalled between said standards, a second pair of standards on said frame, separator rolls journalled between said second standards, a carriage pivoted to said second standards, a half revolution clutch on said table under the free end of said carriage, a counter on said table, a lower tier and an upper tier of boxes on the forward end of said table, an upper conveyor and a lower conveyor leading to said upper and lower tiers respectively from a transfer point, means for moving said carriage periodically from one conveyor to the other at said transfer point by said clutch, devices for controlling said counter by said picker rolls, and devices for controlling said clutch by said counter.

3. Shifting carriage mechanism for a machine delivering a plurality of lines of products comprising a pair of standards, separator rolls journalled between said standards, the lower separator roll including a plurality of pulleys, a carriage frame having longitudinal members pivoted to said standards and a transverse member near the free end of said longitudinal members, said frame also carrying a transverse roller at its free end, conveyor belts around said pulleys and said roller, there being a pair of belts to each line of products, a half revolution clutch under the free end of said frame, said clutch having a transverse shaft with a crank arm at each end under the ends of said transverse member, connecting rods connecting said transverse member and said crank arms, and means for causing said frame to be shifted periodically by said half revolution clutch.

4. Shifting carriage mechanism for a machine delivering a line of products comprising a pair of standards, a delivery roll journalled between said standards, a carriage frame pivoted to said standards, said frame carrying a transverse roller at its free end, a conveyor belt around said delivery roll and said roller, a half revolution clutch under the free end of said frame, said clutch having a transverse shaft with a crank arm under the end of said frame, a connecting rod connecting said frame and said crank arm, and means for causing said frame to be shifted periodically by said half revolution clutch.

5. Shifting carriage mechanism for a machine delivering a line of products comprising a support, a carriage frame pivoted to said support, means for feeding said products onto said frame, a half revolution clutch having a continuously rotating member driven by a source of power, a crank shaft, connections between said crank shaft and said frame, and means for periodically connecting said rotating member to said crank shaft.

6. A distributor mechanism for a machine delivering a line of products comprising an upper conveyor having an upper point of ingress and a lower conveyor having a lower point of ingress, a carriage conveying a line of moving products having a point of egress, means for shifting said carriage and conveyors relatively to allow said carriage to deliver successively to said conveyors, said point of egress being disposed relatively close to said lower point of ingress, when said point of egress and said lower point of ingress are opposed, said point of egress being spaced from said upper point of ingress, when said point of egress and said upper point of ingress are opposed, by a gap sufficient to prevent said line from impinging against the edge of said upper conveyor.

7. A distributor mechanism for a machine delivering a line of products comprising an upper conveyor, including a traveling belt and a rear upper roller, a lower conveyor including a traveling belt and a rear lower roller, a carriage including a forward roller and a traveling belt for conveying a line of products, means for shifting said carriage and said conveyors relatively to allow said carriage to deliver successively to said conveyors, said lower rear roller being disposed relatively close to said forward roller, when said lower rear roller and said forward roller are opposed, said upper rear roller being spaced from said forward roller, when said upper rear roller and said forward roller are opposed, by a gap sufficient to prevent said line from impinging against said upper rear roller.

8. A distributor mechanism for a machine delivering a line of products comprising a base, a rear support, upper and lower shafts mounted on said support, distributor pulleys on said shafts, a forward support, an upper shaft mounted near the top of the forward support, a lower shaft near the bottom of said forward support, a plurality of distributor pulleys on said forward shafts, a distributing belt supported by said upper pulleys, a distributing belt supported by said lower pulleys, means for driving said belts, a shifting carriage for feeding the line of products alternately to said belts, delivery devices for receiving the products from the upper and lower belts.

9. A distributor mechanism for a machine delivering a line of products comprising a base, a pair of rear standards, upper and lower shafts journalled in said standards, distributor pulleys on said shafts, a pair of forward standards, an upper shaft journalled near the top of the forward standards, a lower shaft journalled near the bottom of said forward standards, a plurality of distributor pulleys on said forward shafts, a distributing belt supported by said upper pulleys, a distributing belt supported by said lower pulleys, said rear upper shaft being close to said rear lower shaft in a vertical direction, means for driving said belts, a shifting carriage for feeding the line of products alternately to said belt, delivery devices for receiving the products from the upper and lower belts.

10. A distributor mechanism for a machine delivering a plurality of lines of products comprising a base, a pair of rear standards, upper and lower shafts journalled in said standards, distributor pulleys on each shaft, a pair of forward standards an upper shaft journalled near the top of the forward standards, a lower shaft journalled near the bottom of said forward standards, a plurality of distributor pulleys on each forward shaft, a plurality of distributing belts supported by said upper pulleys, a plurality of distributing belts supported by said lower pulleys, there being a pair of upper distributing belts and a pair of lower distributing belts for each line of products, said rear upper shaft being close to said rear lower shaft in a vertical direction but spaced in a horizontal direction, the upper rear pulleys being smaller than said lower rear pulleys, drive pulleys on said lower rear shaft and said upper forward shaft, a drive belt on said drive pulleys, a third drive pulley on said lower rear shaft, a movable feeding carriage for feeding lines of products alternately to said belts at the rear end thereof, delivery devices for receiving the products from the upper and lower belts at the forward end thereof.

11. Delivery apparatus for a machine delivering a plurality of lines of products comprising a framework including upper and lower supports, a plurality of tiers of boxes on said supports, each box having seats formed at the bases of its two sides, jogging devices for said boxes, a bottom plate mounted on the seats of each box and capable of being pulled forward to deliver a pile of products.

12. Delivery apparatus for a machine delivering a plurality of products comprising a box having an obstruction in the lower rear part of the box, an obstruction in the front upper part of the box, a removable obstruction in the lower front part of the box, and means for delivering products over said rear obstruction.

13. Delivery apparatus for a machine delivery a plurality of products comprising a box having a flat bottom, an obstruction in the lower rear part of the box, obstructions in the front of said box, an obstruction in the top of said box, and devices for delivering substantially flat products over said rear obstruction in a position substantially parallel to said bottom.

14. Delivery apparatus for a machine delivery a plurality of products comprising a box having a flat bottom, means for delivering products to said box in a direction transverse to the height of said box, said products being disposed in a plane substantially parallel to said bottom at the point of delivery, and jogging bars on two adjoining sides for causing said products to smoothly and evenly settle into a pile.

15. Delivery apparatus for a machine delivering a plurality of lines of products comprising a pair of spaced longitudinally extending beams, a pair of rear columns and a pair of forward columns rising from said beams, a lower supporting rod connecting the columns of each pair below said beams, an upper supporting rod connecting the columns of each pair midway the length of said columns, boxes each having two sides with seats at their bases, said seats being secured to said supporting rods, the adjoining sides of adjoining boxes being spaced at the lower portions of the boxes and meeting at the upper portions, a transverse stop plate secured to said forward columns at the upper portions of each tier of boxes, a transverse roof plate at the forward end of each tier of boxes, a door bar at the front of each box, an operating rod for each tier of boxes for operating the door bars of that tier, one side of each of said boxes having a slot for a side jogging bar, each box having a bottom plate resting on its seats and adapted to be pulled forward.

16. Delivery apparatus for a machine delivering a plurality of lines of products comprising a pair of spaced longitudinally extending beams, a pair of rear columns and a pair of forward columns rising from said beams, a lower supporting rod connecting the columns of each pair below said beams, an upper supporting rod connecting the columns of each pair midway the length of said columns, cross members connecting a forward and rear column on each side above said upper rods and at the top, boxes each having two sides turned in at their bases to from seats, said seats being secured to said supporting rods by collars adjustable on said rods, the adjoining sides of adjoining boxes being spaced at the lower portions of the boxes and meeting at the upper portions, a transverse stop plate secured to said forward columns at the upper portions of each tier of boxes, a transverse roof plate at the forward end of each tier of boxes, clamps securing the sides of the boxes in each row to their respective roof plates, a door bar at the front of each box, an operating rod for each tier of boxes for operating the door bars of that tier, abutment means for limiting the downward position of said bars, one side of each of said boxes having spaced vertical slots for side jogging bars, each box having a bottom plate resting on its seats and adapted to be pulled forward on its door bar when said door bar is lowered.

In testimony whereof I have hereunto set my hand and seal.

LOUIS PUTNAM WILLSEA.